United States Patent Office 3,249,464
Patented May 3, 1966

3,249,464
MOLDED AND LAMINATED SILICEOUS ARTICLES AND METHODS OF PREPARING SAME
Lee E. Nelson and Edwin P. Plueddemann, Midland, Mich., assignors to Dow Corning Corporation, Midland, Mich., a corporation of Michigan
No Drawing. Filed Feb. 2, 1962, Ser. No. 170,779
10 Claims. (Cl. 117—76)

This application is a continuation-in-part of applicants' copending application Serial No. 134,130, filed August 28, 1961, now abandoned.

This invention relates to the treatment of siliceous materials with certain alpha,beta-unsaturated organosilicon compounds, to improve the bond strength between the siliceous material and organic resins.

It is known that allyl and vinyl-substituted organosilicon compounds as well as beta-vinylphenyl-ethyl-substituted silicon compounds

can be applied to siliceous materials in order to improve the bond between the siliceous material and vinylic resins. These silicone materials are characterized by having a terminal double bond. Heretofore, alkenyl-substituted silicon compounds in which the double bond is internal have not been suitable for this use. Applicant has found unexpectedly, however, that certain alpha, beta conjugated unsaturated ester derivatives of organosilicon compounds are useful in the improvement of the bond between siliceous materials and organic resins, even though the double bond is nonterminal.

It is the object of this invention to provide a coated siliceous material which is useful in preparing superior laminates from vinylic resins and from epoxide resins. Another object is to provide a coated siliceous material which gives superior laminates and other molded articles. Other objects and advantages will be apparent from the following description.

This invention relates to siliceous articles, the surface of which are coated with a siloxane of the unit formula of the group

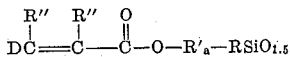

and

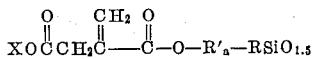

in which

D is of the group

phenyl and $CH_3CH=CH-$ radicals,
X is of the group hydrocarbon radicals of less than 7 carbon atoms, H and radicals of the formula

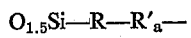

each
R'' is of the group H, methyl and

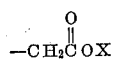

radicals where X is as above defined,
R' is an aliphatic radical composed of C, H and O, the latter being in the form of ether linkages or hydroxyl groups, in R' the ratio of C to O being not greater than 3:1,
R is an alkylene radical of 1 to 4 inclusive carbon atoms, and
$a$ has a value from 0 to 1 inclusive.

The articles of this invention are prepared by applying the siloxane to the surface of the siliceous article in any convenient manner. The siloxane can be applied as such to the surface of the siliceous material either in the form of an emulsion or a solution in an organic solvent or as a solution of the corresponding siloxanols in water. Alternatively, the siloxane can be formed in situ on the surface of the siliceous material by treating the latter with the corresponding silanes of the formula

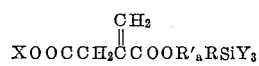

or

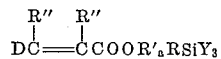

in which Y is a hydrolyzable radical. The hydrolyzable group will then react with the water or hydroxyl groups on the surface of the siliceous material, thereby generating the siloxane in situ. The silanes can be applied to the siliceous surface either in the vapor state or in liquid form.

The siloxane can contain uncondensed silicon-bonded OH groups and some residual Y groups attached to the silicon. Siloxanes containing these groups are included within the scope of the claims.

The amount of siloxane on the surface of the siliceous article is not critical and will vary depending upon the use to which the article is to be put. In general, the amount of siloxane coating will vary from .01 percent to 10 percent by weight based on the weight of the siliceous material. The preferred amount is from .1 to 3 percent especially when the siliceous material is to be used in the formation of improved molded articles as hereinafter described.

As stated above, the organosilicon compound can be applied to the surface of a siliceous material in dispersed form either as a solution or an emulsion. In general, satisfactory results are obtained when the siliceous material is treated with a dispersion of the organosilicon compound in a carrier in which the concentration of organosilicon compound ranges between .01 and 10 percent by weight of the carrier. These concentrations apply whether the organosilicon compound is in the form of a silane, a siloxane or a siloxanol and whether the organosilicon compound is dispersed in an organic solvent or an aqueous medium.

After applying the siloxane to the surface of the siliceous material, the coated article is then allowed to dry. The drying can be hastened by heating at temperatures of up to 250° F. or above, for a short time.

For the purpose of this invention the siliceous material can be in any form, that is the form of sheets, plates, ribbons, flakes, fibers or powders. The term siliceous applies to any silicon-oxygen containing material such as glass, mica, quartz, clay, asbestos and silicates such as aluminum silicate, calcium aluminum silicate, magnesium silicate, zirconium silicate and the like.

One of the outstanding features of the siliceous articles of this invention is their receptivity to organic resins such as vinylic resins and epoxide resins. When a resin of these types is polymerized in contact with the coated siliceous article, a tenacious bond is obtained between the organic resin and the siliceous article. This is presumably due to an interaction between the organic resin and the functional groups in the siliceous material, however, this invention is in no way restricted to such an explanation.

The improved adhesion can be employed in many ways. Thus, it may be used to improved the adhesion of protective or decorative coatings to siliceous articles. In such a case, the siliceous article would first be coated with the siloxane of this invention and thereafter coated with the organic resin and the finished coating cured in accordance with the normal procedures for curing the organic resin. This will give a protective coating of exceptional durability.

One of the primary advantages of the articles of this invention is the use of coated particulated siliceous materials as fillers in the formation of molded articles. These articles are characterized by improved flexural and compressive strengths particularly under moist conditions. The term particulated as employed herein refers to siliceous materials in a state of subdivision, useful for fillers in the preparation of molded articles and refers to fiber, flake and powdered materials.

The organosiloxanes which are employed to coat the siliceous articles of this invention are best prepared from the corresponding hydrolyzable silanes. The preparation of both the siloxanes and silanes is disclosed and claimed in the copending application of Edwin P. Plueddemann entitled "α,β-Conjugated, Substituted-Organosilicon Compounds," Serial No. 170,177, filed concurrently herewith on February 2, 1962, and now U.S. Patent No. 3,179,612, which disclosure is hereby incorporated in this application by reference.

Briefly, the silanes can be prepared by reacting the vinyl, allyl or butenyl esters of maleic, fumaric, itaconic, aconitic, citraconic, cinnamic, sorbic, α,β-dimethylmaleic and

HOOCC=CCOOH
|   |
HOOCCH₂CH₂COOH acids with silanes of the formula HSiY₃ in the presence of a platinum catalyst such as chloroplatinic acid, platinum-on-charcoal or platinum-on-alumina. The reaction proceeds under the normal conditions for adding aliphatic unsaturated compounds to SiH compounds.

A second basic method for preparing the silanes is employed where R is a methylene radical. These compounds are best prepared by reacting the tertiary amine salt of the corresponding acids or their partial esters with a compound of the formula ClCH₂SiY₃. This reaction is best carried out in the presence of a mutual solvent and proceeds rapidly at temperatures of from 100 to 175° C. with the precipitation of the amine hydrochloride. In carrying out this reaction, it is essential that Y be a hydrolyzable group which is not reactive to amines. In other words, Y can be alkoxy or an equivalent thereof.

In the siloxanes employed in this invention, R can be any alkylene radical of from 1 to 4 inclusive carbon atoms such as, for example, methylene, ethylene, propylene or butylene. R can be either a straight-chained radical or a branch-chained radical.

The optional R' radical can be any aliphatic radical composed of carbon, hydrogen and oxygen, where the oxygen is either in the form of an ether linkage or an hydroxyl group. Thus R' can either be an ether radical sumh as —CH₂CH₂O—, (CH₂CH₂O)₅—,
—(CH₂CH₂O)₁₀₀— or

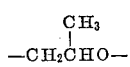
—CH₂CHO— or a hydroxylated alkylene radical such as

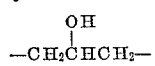
—CH₂CHCH₂— or an hydroxyl-alkylene ether radical such as

—CH₂CHCH₂O—

For the purpose of this invention, X can be a hydrogen, O₃/₂SiRR'ₐ— radial or any hydrocarbon radical of less than 7 carbon atoms such as methyl, ethyl, isopropyl, butyl, hexyl, vinyl, allyl, phenyl, cyclohexyl, or cyclopentyl.

For the purpose of this invention R" can be H or methyl or

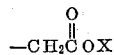
—CH₂COX where X can be any of the specific radicals shown for X in the preceding paragraph.

As mentioned above, the coated articles of this invention are particularly desirable for preparing molded articles of improved strength with vinylic and epoxide resins.

The term "vinylic resin" as employed herein means those resins which polymerize by way of carbon, carbon unsaturation, i.e. =C=C= —C≡C—. The term includes both polymers containing this unsaturation and vinylic monomers. In forming the molded articles of this invention, one can use a vinylic polymer which is then brought in contact with the coated siliceous material and polymerized under standard conditions or one may start with a vinylic monomer and carry out the entire polymerization in contact with the coated siliceous material or one may employ a mixture of vinylic polymer and vinylic monomer. All of these materials are well known in the art.

Specific examples of vinylic resins which can be employed herein include any vinylic resin such as olefins, such as ethylene, propylene, styrene, butadiene and isoprene, unsaturated polyesters such as those made from maleic, fumaric and itaconic acids by reacting them with glycols such as ethylene glycol, propylene glycol and the like; unsaturated esters such as diallylphthalate, vinylacetate, diallylfumarate, methylmethacrylate, ethylmethacrylate and ethylacrylate; nitrogen containing vinylic resins such as acrylonitrile and allylcyanurate; halogenated vinylic resins such as chloroprene, vinylchloride, vinylidenechloride and copolymers of any of the above such as copolymers of butadiene and styrene; copolymers of butadiene and isobutylene and alkenyl siloxanes such as vinylsiloxanes, allylsiloxanes or copolymers of vinylsiloxane with methyl and phenylsiloxanes.

The term epoxide resin as employed herein includes any resinous material containing the grouping

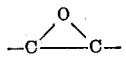
—C——C—

Specific examples of operative epoxide resins are shown in U.S. Patent 2,592,560, the entire disclosure of which is incorporated in this application by reference. Briefly, epoxide resins are prepared by reacting polyhydric-phenols with polyfunctional chlorohydrins and/or polyepoxides and mixtures thereof.

In molding the siliceous article with the organic resin, one can employ the conventional techniques and conventional catalysts for curing the vinylic and the epoxide resins.

In addition to the siloxane coatings above defined, the siliceous material can also be applied along with various sizing materials to improve the handling properties of the material prior to molding with the organic resin. This is particularly true when the siliceous material is in the form of glass or quartz fibers where the sizing is needed in order to cause the fibers to adhere sufficiently to be spun, woven or chopped, and to lubricate them sufficiently so that they do not abrade during handling. These sizing materials can be applied to the siliceous material either simultaneously with or subsequently to the application of the siloxane of this invention.

Specific examples of such sizing materials are water-soluble alcohols having at least two hydroxy groups per molecule, such as resorcinol, trimethylolethane, neopentyl glycol, and polyalkylene glycols; film-forming organic resins which are miscible with water and which when dried are converted to a state which is not miscible with water such as latices of polyvinylacetate, methylacrylate, methylmethacrylate and copolymers thereof, butadiene, vinylidene chloride, styrene, acrylonitrile, vinyl chloride and chlorovinylacetate; chrome complexes of methacrylic acid; cationic active substances such as cetyl or stearyl-monoamine hydrochlorides or acetates, dodecyldimethylamine and its salts and trimethylstearyl ammonium chloride; alkyd resins such as trimellitic alkyd resin; or ganosilanes such as those of the formula $Si(OCH_3)_4$, $Si(OCH_2CH_2OMe)_4$; methoxysilanes such as methyltrimethoxysilane, methyltriacetoxysilane, β-acetoxyethyltrimethoxysilane, gamma-acetoxy-propyltriethoxysilane and ethyltrimethoxysilane, and boric acid or alkyl borates.

The molded articles of this invention can contain in addition to the resin and filler, other materials normally added to molded articles such as pigments, ultraviolet light absorbers, oxidation inhibitors, plasticizers and other materials normally added to organic molding compositions.

The following examples are illustrative only and should not be construed as limiting the invention which is properly delineated in the appended claims.

EXAMPLE 1

Each of the silane compositions listed below was applied to heat-cleaned 181 glass cloth in the form of a solution having the concentrations shown in the table below. The glass was dipped into the solution, then removed therefrom, air-dried and heated 7 minutes at 230° F.

In each case the treated glass was impregnated with the resins shown below in accordance with the procedure below described and then the treated glass was stacked into a 14 ply laminate by laying up the warp threads at 90° angles in alternate layers. The laminate was then molded as described. In each case the molded laminate was about 120 mils thick and contained about 30 percent by weight of the cured organic resin.

The physcial properties of the laminates were then determined as follows: the flexural strength was determined in accordance with U.S. Federal Specification L–P 406b, Method 1031, and the compressive strength was determined in accordance with Method 1021 of the same specification. The flexural strength of the molded laminates was determined in the dry state and after a sample of each laminate had been boiled in water for two hours, then cooled to room temperature and wiped dry. The results of the latter test are referred to in the table below as the "two hour boil." The two hour boil flexural strength times 100, divided by the strength of the laminate as molded gives the percent retention.

The polyester resin employed was a solution of 70 parts linear polyester in 30 parts styrene monomer to which had been added .5 part of benzoyl peroxide dissolved in about 7.5 parts styrene monomer. The linear polyester was one prepared from phthalic acid and maleic acid in equimolar proportions reacted with propylene glycol in such amount that the 70 percent solution of this polyester in styrene had an acid number of about 35. The molding was carried out by heating for 30 minutes at 110° C. and 30 p.s.i.

The epoxide resin employed was a reaction product of bis(para - hydroxyphenyl)dimethylmethane and epichlorohydrin which product had an epoxide equivalent weight of 187 to 193. This material was diluted with acetone to give a 60 percent by weight resin solution and the mixture was catalyzed with 14.5 parts of meta-phenylenediamine per 100 parts of resin solids. The 181 glass cloth was impregnated to give a laminate containing 65 percent by weight glass and 35 percent by weight epoxy resin and the laminate was cured by heating 30 minutes at 150° C. at 30 p.s.i.

The silanes employed in the tables below were as follows:

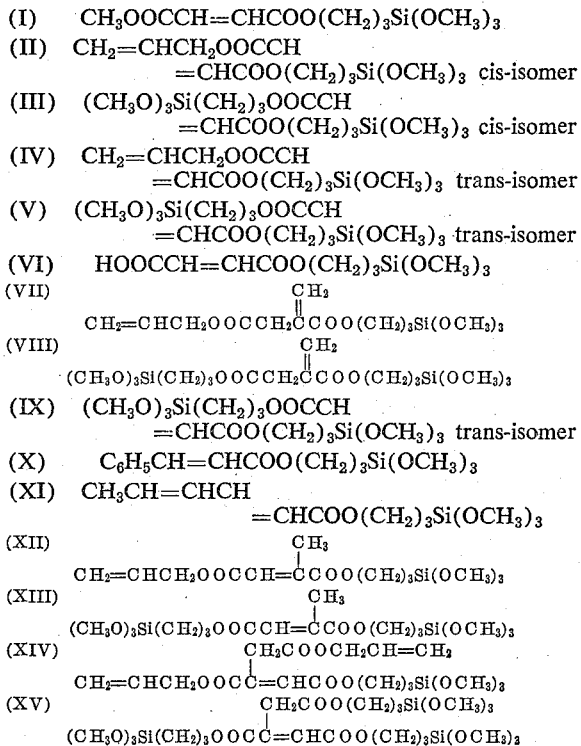

Table I

POLYESTER RESIN

| Compound | Applied as— | Conc. in. percent by wt. | Flexural strength in p.s.i. As molded | Flexural strength in p.s.i. 2 Hr. boil | Compressive strength in p.s.i. | Percent Retention |
|---|---|---|---|---|---|---|
| I | Water solution of hydrolyzate | 0.5 | 79,800 | 77,500 | 33,800 | 97 |
|   | I added to polyester resin | 1.0 | 85,000 | 71,500 | 45,500 | 84 |
| II | Toluene solution | 0.5 | 74,200 | 65,000 | 30,000 | 88 |
| III | do | 0.5 | 83,500 | 77,600 | 44,400 | 93 |
| IV | do | 0.5 | 82,100 | 70,100 | 42,500 | 85 |
| V | do | 0.5 | 79,200 | 78,300 | 52,500 | 99 |
| VI | Water solution of hydrolyzate | 0.5 | 65,200 | 62,700 | 29,800 | 96 |
| VII | do | 0.5 | 89,600 | 84,800 | 50,300 | 95 |
| VIII | do | 0.5 | 84,600 | 69,400 | 46,800 | 83 |
|   | Toluene-acetone solution | 0.5 | 76,200 | 70,200 | 39,500 | 92 |
| IX | Water solution of hydrolyzate | 0.5 | 88,000 | 79,200 | 51,300 | 90 |
| X | Toluene-acetone | .05 | 79,800 | 74,800 | 44,100 | 94 |
| XI | Water | .05 | 97,400 | 89,500 | 52,900 | 91 |
| XII | do | .05 | 53,900 | 66,800 | 29,000 |  |
| XIII | do | .05 | 59,500 | 51,600 | 29,400 | 86.5 |
| XIV | Toluene acetone | .05 | 83,200 | 78,300 | 39,600 | 88 |
| XV | Water | .05 | 70,100 | 66,600 | 42,000 | 94 |

Table II
EPOXIDE RESIN

| Compound | Applied as— | Conc. in percent by wt. | Flexural strength in p.s.i. | | Compressive strength in p.s.i. | Percent Retention |
|---|---|---|---|---|---|---|
| | | | As molded | 2 Hr. boil | | |
| II | Toluene solution | 0.25 | 88,500 | 78,800 | 57,100 | 89 |
| IX | Water solution of hydrolyzate | 0.5 | 87,000 | 77,300 | 45,000 | 89 |

The organic solvent solutions of the silanes were prepared by merely dissolving the silane per se in the solvent. Thus, the siloxane coating was formed by in situ reaction of the silane with the water and hydroxyl groups on the surface of the glass.

The aqueous solutions of the hydrolyzates were formed by mixing the silane with .1 percent solution of acetic acid in water and thereafter agitating the mixture until a homogeneous solution of the siloxane hydrolyzate was obtained. In these cases the glass was treated with the siloxane as such.

EXAMPLE 2

Improved molded articles are obtained when 35 percent by weight of the following siliceous materials, based on the weight of the polyester resin and the epoxide resin, are employed in each of the runs in Example 1; mica flakes, diatomaceous earth, flake glass, aluminum silicate, asbestos fibers, fume silica and quartz fibers.

EXAMPLE 3

Improved molded articles are obtained when the following vinylic resins are substituted in the process of Example 1; alpha-methylstyrene, copolymers of butadiene and styrene, methylmethacrylate, vinylchloride and acrylonitrile.

EXAMPLE 4

Improved laminates are obtained when toluene solutions of the following silanes are employed in the procedure of Example 1:

$$C_6H_{11}OOCCH=CHCOOCH_2\overset{CH_3}{\underset{|}{C}}HCH_2Si(OCH_3)_3$$

$$HOOCCH=CHCOO(CH_2CH_2O)_{100}(CH_2)_3Si(OOCCH_3)_3$$

$$(CH_3O)_3SiCH_2OO\overset{CH_2}{\overset{\|}{C}}CH_2COOCH_2Si(OCH_3)_3$$

$$CH_3OOCCH=$$
$$CHCOO(C_2H_4O)_3(C_3H_6O)_2CH_2\overset{OH}{\underset{|}{C}}HCH_2O(CH_2)_3Si(OCH_3)_3$$

$$CH_3OOCCH=CHCOOCH_2\overset{OH}{\underset{|}{C}}HCH_2CH_2Si(OCH_3)_3$$

$$Cl_3Si(CH_2)_3O\overset{O}{\overset{\|}{C}}CH=CH\overset{O}{\overset{\|}{C}}O(CH_2)_3SiCl_3$$

$$(C_2H_5O)_3SiCH_2CH_2O\overset{O}{\overset{\|}{C}}CH=CH\overset{O}{\overset{\|}{C}}OCH_2CH_2Si(OC_2H_5)_3$$

$$CH_3OOCCH_2$$
$$CH_3OOC\overset{|}{C}=CHCOO(CH_2)_3Si(OCH_3)_3$$

$$Cl_3Si(CH_2)_3OCH_2CH_2OOCCH=$$
$$CHCOOCH_2CH_2O(CH_2)_3SiCl_3$$

That which is claimed is:

1. A siliceous material, the surface of which is coated with a dry layer consisting essentially of a siloxane of a unit formula $$XO\overset{O}{\overset{\|}{C}}CH=CH\overset{O}{\overset{\|}{C}}ORSiO_{1.5}$$

in which X is a hydrocarbon radical of less than 7 carbon atoms and R is an alkylene radical of from 1 to 4 inclusive carbon atoms.

2. A siliceous material, the surface of which is coated with a dry layer consisting essentially of a siloxane of a unit formula $$O_{3/2}SiRO\overset{O}{\overset{\|}{C}}CH=CH\overset{O}{\overset{\|}{C}}ORSiO_{1.5}$$

in which R is an alkylene radical of from 1 to 4 inclusive carbon atoms.

3. A siliceous material, the surface of which is coated with a dry layer consisting essentially of a siloxane of a unit formula $$CH_3CH=CHCH=CH\overset{O}{\overset{\|}{C}}ORSiO_{1.5}$$

in which R is an alkylene radical of 1 to 4 inclusive carbon atoms.

4. In a method of producing a molded article the improvement which is polymerizing a material selected from the group consisting of vinylic resins and epoxide resins in contact with a particulated siliceous material, the surface of which is coated with a dry layer consisting essentially of a siloxane of a unit formula selected from the group consisting of $$D\overset{R''}{\underset{|}{C}}=\overset{R''}{\underset{|}{C}}-\overset{O}{\overset{\|}{C}}OR'_a-RSiO_{1.5}$$

and $$XO\overset{O}{\overset{\|}{C}}CH_2\overset{CH_2}{\underset{|}{C}}-\overset{O}{\overset{\|}{C}}OR'_a-RSiO_{1.5}$$

in which
D is selected from the group consisting of $$-\overset{O}{\overset{\|}{C}}OX$$

phenyl and $CH_3CH=CH-$ radicals,
X is selected from the group consisting of hydrocarbon radicals of less than 7 carbon atoms, hydrogen and radicals of the formula $O_{1.5}SiRR'_a-$, each
R'' is selected from the group consisting of hydrogen, methyl and $$-CH_2\overset{O}{\overset{\|}{C}}OX$$

radicals where X is as above defined,
R' is an aliphatic radical composed of carbon, hydrogen and oxygen, the latter being in the configuration selected from the group consisting of ether linkages and hydroxyl groups, in R' the ratio of carbon to oxygen being not greater than 3:1,
R is an alkylene radical of from 1 to 4 inclusive carbon atoms, and
a has a value from 0 to 1 inclusive.

5. A composite article which consists essentially of (1) a siliceous material which is coated with a dry layer consisting essentially of a siloxane of a unit formula selected from the group consisting of $$D\overset{R''}{\underset{|}{C}}=\overset{R''}{\underset{|}{C}}-\overset{O}{\overset{\|}{C}}OR'_a-RSiO_{1.5}$$

and $$XO\overset{O}{\overset{\|}{C}}CH_2\overset{CH_2}{\underset{|}{C}}-\overset{O}{\overset{\|}{C}}OR'_a-RSiO_{1.5}$$

in which
D is selected from the group consisting of $$-\overset{O}{\overset{\|}{C}}OX$$

phenyl and $CH_3CH=CH-$ radicals,

X is selected from the group consisting of hydrocarbon radicals of less than 7 carbon atoms, hydrogen and radicals of the formula $O_{1.5}SiRR'_a-$, each R'' is selected from the group consisting of hydrogen, methyl and

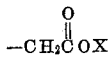

radicals, where X is as above defined,
R' is an aliphatic radical composed of carbon, hydrogen and oxygen, the latter being in a configuration selected from the group consisting of ether linkages and hydroxyl groups, in R' the ratio of carbon to oxygen being not greater than 3:1,
R is an alkylene radical of from 1 to 4 inclusive carbon atoms, and
$a$ has a value from 0 to 1 inclusive and (2) a cured resin selected from the group consisting of vinylic resins and epoxide resins which resin bonds the siliceous material into a unitary article.

6. An article in accordance with claim 5 in which the siloxane is of the unit formula

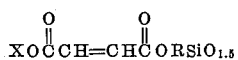

in which X is a hydrocarbon radical of less than 7 carbon atoms and R is an alkylene radical of from 1 to 4 inclusive carbon atoms.

7. An article in accordance with claim 5 in which the siloxane has the unit formula

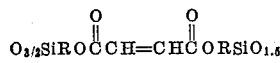

in which R is an alkylene radical of from 1 to 4 inclusive carbon atoms.

8. An article in accordance with claim 5 in which the siloxane is of the unit formula

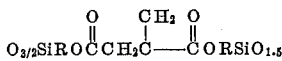

in which R is an alkylene radical of from 1 to 4 inclusive carbon atoms.

9. An article in accordance with claim 5 in which the siloxane is of the unit formula

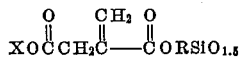

in which X is a hydrocarbon radical of less than 7 carbon atoms and R is an alkylene radical of from 1 to 4 inclusive carbon atoms.

10. An article in accordance with claim 5 in which the siloxane is of the unit formula

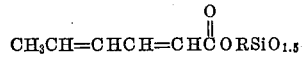

in which R is an alkylene radical of from 1 to 4 inclusive carbon atoms.

References Cited by the Examiner

UNITED STATES PATENTS

| | | | |
|---|---|---|---|
| 2,742,378 | 4/1956 | Grotenhuis | 117—100 |
| 2,763,573 | 9/1956 | Biefeld | 117—126 |
| 2,770,632 | 11/1956 | Merker | 260—448.2 |
| 2,819,245 | 1/1958 | Shorr | 260—448.2 |
| 2,823,218 | 2/1958 | Speier et al. | 260—448.2 |
| 2,833,802 | 5/1958 | Merker | 260—448.2 |
| 2,841,566 | 7/1958 | Grotenhuis | 117—126 |
| 2,843,560 | 7/1958 | Mika | 117—126 |
| 2,898,361 | 8/1959 | Barnes | 260—448.2 |
| 2,906,735 | 9/1959 | Speier | 260—448.2 |
| 2,922,806 | 1/1960 | Merker | 260—448.2 |
| 2,931,739 | 4/1960 | Marzocchi et al. | 117—126 |
| 2,974,062 | 3/1961 | Collier | 117—126 |
| 3,062,242 | 11/1962 | Vanderbilt | 117—126 |
| 3,081,195 | 3/1963 | Biefeld et al. | 117—72 X |

FOREIGN PATENTS

| | | |
|---|---|---|
| 544,555 | 2/1956 | Belgium. |
| 780,553 | 8/1957 | Great Britain. |

OTHER REFERENCES

Skeist: Epoxy Resins, Reinhold Pub. Corp., N.Y., 1958, p. 80 relied on.

Sidlovsky: Silicones in the Fiber Glass Industry, The Glass Industry, September 1960, pp. 499, 500, 501 and 524.

RICHARD D. NEVIUS, *Primary Examiner.*

JOSEPH B. SPENCER, *Examiner.*